(12) United States Patent
Yamada et al.

(10) Patent No.: US 7,113,291 B1
(45) Date of Patent: Sep. 26, 2006

(54) IMAGE FORMATION APPARATUS LIMITING PRINT OPERATION ACCORDING TO ADDITIONAL INFORMATION EMBEDDED IN INPUT IMAGE DATA

(75) Inventors: Osamu Yamada, Toyokawa (JP); Katsuhisa Toyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/494,253

(22) Filed: Jan. 31, 2000

(30) Foreign Application Priority Data

Jan. 29, 1999 (JP) ................................ 11-022618

(51) Int. Cl.
*G06K 15/02* (2006.01)
*G06F 3/12* (2006.01)
*G06F 13/00* (2006.01)

(52) U.S. Cl. .................... 358/1.13; 358/1.13; 358/1.15

(58) Field of Classification Search ............... 358/1.15, 358/1.13, 1.14, 1.18, 1.9, 402, 434, 436, 358/438, 440, 447, 1.17, 1.6, 1.4, 1.2, 2.1, 358/3.28, 3.27, 426.02; 382/100, 116, 229, 382/283, 306, 309, 144, 165, 175, 176, 101, 382/112

See application file for complete search history.

(56) References Cited

U.S. PATENT DOCUMENTS

| 5,467,169 | A | | 11/1995 | Morikawa ................... 355/201 |
| 5,659,639 | A | * | 8/1997 | Mahoney et al. ........... 382/309 |
| 5,671,277 | A | * | 9/1997 | Ikenoue et al. ................ 380/7 |
| 6,522,421 | B1 | * | 2/2003 | Chapman et al. .......... 358/1.15 |

FOREIGN PATENT DOCUMENTS

| JP | 10-282141 | 8/1988 |
| JP | 7-110645 | 4/1995 |
| JP | 7-129270 | 5/1995 |

* cited by examiner

*Primary Examiner*—Douglas Q. Tran
(74) *Attorney, Agent, or Firm*—McDermott Will & Emery LLP (57) ABSTRACT

An image formation apparatus includes a scanner unit entering image data, a printer unit printing out input image data, a signature information detection unit detecting additional information including destination information from the image data, and a communication processing unit transmitting information related to printing of image data to the detected destination. Additional information including destination information is detected from the image data. Information related to printing of image data is transmitted to the destination detected from the image data. Accordingly, information related to printing when image data is printed is audited at the destination side.

8 Claims, 6 Drawing Sheets

| TRIGGER | CONTROL OPERATION 1 | CONTROL OPERATION 2 | CONTROL OPERATION 3 |
|---|---|---|---|
| AAA | PRINT | COUNT NUMBER OF PRINTS | TRANSMIT NUMBER OF PRINTS TO ADDRESS aaaa |
| BBB | BINARIZATION PROCESS ON IMAGE DATA | PRINT | |
| CCC | SUPPRESS PRINT | DISPLAY "PRINT DISABLED" ON SCREEN | |
| | | | |

| TRIGGER | CONTROL OPERATION 1 | CONTROL OPERATION 2 | CONTROL OPERATION 3 |
|---|---|---|---|
| AAA | PRINT | COUNT NUMBER OF PRINTS | TRANSMIT NUMBER OF PRINTS TO ADDRESS aaaa |
| BBB | BINARIZATION PROCESS ON IMAGE DATA | PRINT | |
| CCC | SUPPRESS PRINT | DISPLAY "PRINT DISABLED" ON SCREEN | |
| | | | |

IMAGE FORMATION APPARATUS LIMITING PRINT OPERATION ACCORDING TO ADDITIONAL INFORMATION EMBEDDED IN INPUT IMAGE DATA

This application is based on Japanese Patent Application No. 11-22618 filed in Japan, the contents of which are hereby incorporated by reference.

BACKGROUND OF THE INVENTION

1. Field of the Invention

The present invention relates to image formation apparatuses such as digital copy machines and printers. Particularly, the present invention relates to an image formation apparatus that limits the print operation according to additional information embedded in input image data.

2. Description of the Related Art

It is now possible to easily copy a document image by virtue of the spread of digital copy machines. Also, digital data can be printed onto a recording medium such as a sheet of paper by providing to a digital copy machine an image produced by a computer, a photograph, a picture, and digital data obtained by shooting using a digital camera.

There are cases where the digital data of a document or a computer-produced image that is to be copied is owned by the creator thereof. The creator may not wish to have the document or the digital data printed out. The concealment technique of embedding ID information or a logo as signature information into the document or digital data is known in order to prevent unlimited printing of documents and digital data.

By verifying the printed out sheet as to the image or digital data in which signature information is embedded, the document image or digital data that is the source of the printout can be identified. However, royalties associated with the printing of the image or digital data cannot be collected appropriately. An unscrupulous user can obtain a printout freely.

SUMMARY OF THE INVENTION

The present invention is directed to solve the above problems, and an object is to provide an image formation apparatus that can audit information related to printing of image data.

Another object of the present invention is to provide an image formation apparatus that can limit the printing condition by which image data is to be printed.

A further object of the present invention is to provide an image formation apparatus that can print out image data at a different picture quality.

Still another object of the present invention is to provide an image recording apparatus that can audit information related to printing of image data.

According to an aspect of the present invention, an image formation apparatus includes an input unit entering image data, a printer unit printing out the input image data, a detector detecting additional information in which destination information is included from the image data, and a transmission controller transmitting print information related to printing of image data to the detected destination.

According to another aspect of the present invention, an image formation apparatus includes an input unit entering image data, a printer unit printing out the image data, a memory storing trigger information to initiate execution of a control operation and the control operation in correspondence, a detector detecting additional information including the trigger information from the image data, and a controller responsive to detection of the trigger information to execute the control operation corresponding to the trigger information stored in the memory. The control operation includes a transmission operation of transmitting print information related to printing of image data to a destination.

According to the present invention, an image formation apparatus that can audit information related to printing of image data can be provided.

According to a further aspect of the present invention, an image recording apparatus includes an input unit entering image data, a record unit recording the image data to a recording medium, a detector detecting additional information in which destination information is included from the image data, and a transmission controller transmitting record information related to recording of image data to the detected destination.

According to still another aspect of the present invention, an image recording apparatus includes an input unit entering image data, a record unit recording the image data to a recording medium, a detector detecting additional information in which trigger information to initiate execution of a predetermined control operation is included from the image data, and a controller executing the predetermined control operation in response to detection of the trigger information. The predetermined control operation includes a transmission operation of transmitting information related to recording of image data to the destination.

According to the present invention, an image recording apparatus that can audit record information related to recording of image data can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the drawings, the same reference characters denote the same or corresponding components.

Figure 1:
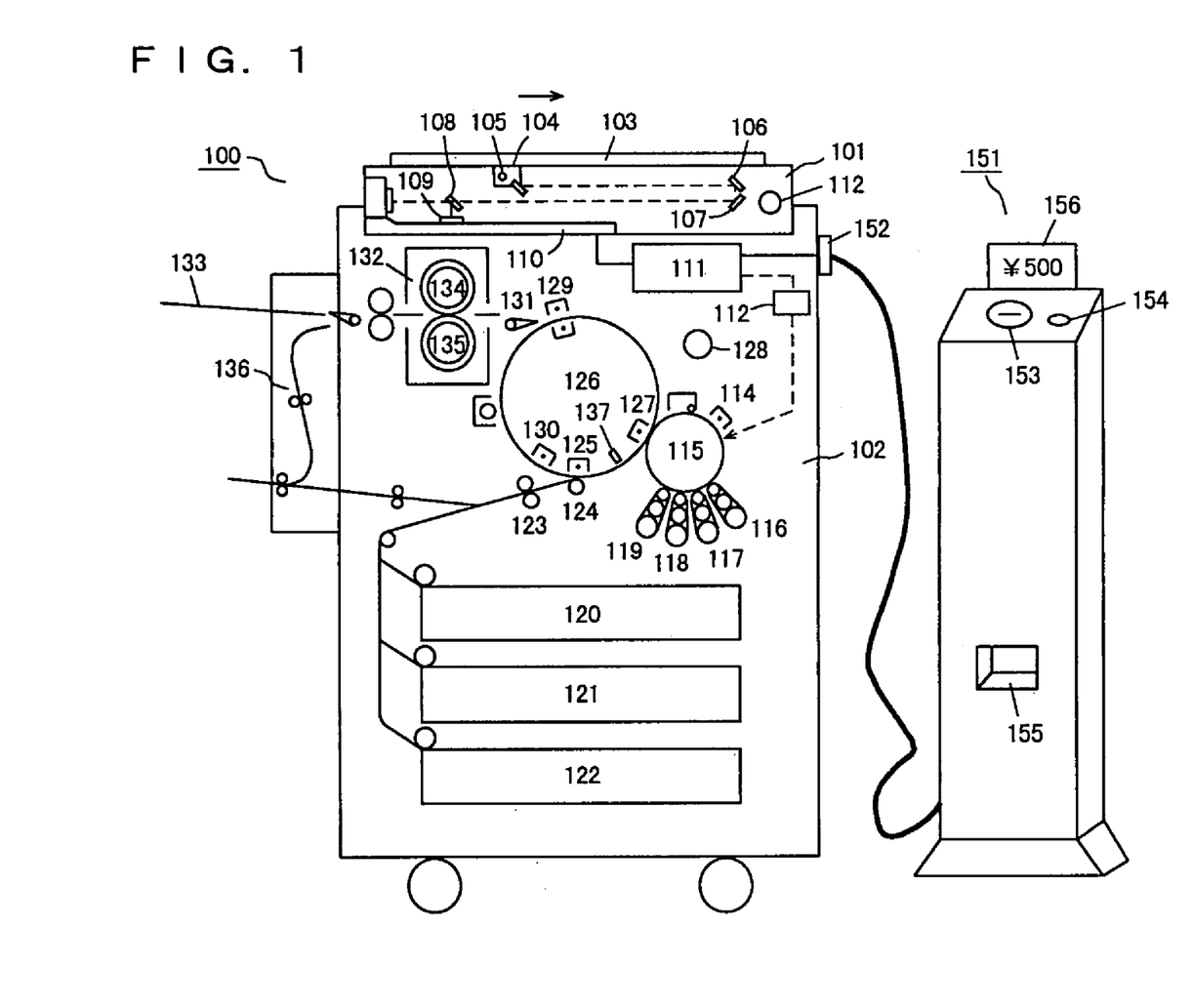
FIG. 1 shows an entire structure of a digital copy machine according to an embodiment of the present invention.

Referring to FIG. 1, a digital copy machine 100 is connected to a copy vender 151 that collects the copy fee according to the number of prints.

Digital copy machine 100 includes an image reader 101 reading out image data from a document, and a printer unit 102 printing out an image onto a sheet.

A document placed on a document platen 103 of image reader 101 is irradiated by an exposure lamp 105 of a scanner 104. The light reflected from the document plane passes through mirrors 106–108 and the collective lens form an image on a full color CCD (charge coupled device) sensor 109. Full color CCD sensor 109 converts the light reflected from the document plane into electric signals (analog signals) of red (R), green (G) and blue (B). The converted signals are provided to a processing unit 111. Scanner 104 moves in the direction of the arrow in FIG. 1 (subscanning direction) by a scanner motor 112 to scan the entire document.

Processing unit 111 converts the input analog signals into predetermined digital signals and stores the same in an image memory 110. The digital signals stored in image memory 110 are converted into laser driving signals and output to a laser device 112. Laser device 112 outputs a laser beam according to the input digital signal.

Processing unit 111 is connected to a communication processing unit not shown. Digital data transmitted from an external personal computer or the like is received at the communication processing unit. The received digital data is applied to processing unit 111. The digital data input to processing unit 111 is stored in image memory 110.

At printer unit 102, the laser beam output from laser device 112 is directed onto a photoreceptor drum 115 that is charged by a corona charger 114, whereby an electrostatic latent image is formed. Toner developer units 116–119 of the four colors of cyan, magenta, yellow and black are sequentially selected, and the electrostatic latent image on photoreceptor drum 115 is developed. An appropriate sheet is delivered from sheet cassettes 120–122. The sheet passes through a timing roller 123. The sheet is attracted on a transfer drum 126 by an electrostatic absorption charger 125 provided opposite to an absorption roller 124.

The toner image developed on photoreceptor drum 115 is transferred onto the sheet wound around transfer drum 126 by a transfer charger 127. The rotation of transfer drum 115 is controlled by a drum motor 128. In a full color copy mode, the above printing step is repeated for the four colors of cyan, magenta, yellow and black.

In other words, transfer drum 126 is rotated 4 times. Then, the sheet is detached from transfer drum 126 by virtue of the discharge at the surface of transfer drum 126 and the action of a separation claw 131 through means of a separation charger 129 and a discharger 130. The sheet passes through a fix device 132 to be subjected to the fixing process, and then output onto a discharge tray 133.

Fix device 132 includes an upper roller 134 and a lower roller 135. Respective rollers 134 and 135 are adjusted to attain a predetermined temperature by a heater.

When in a dual copy mode, the sheet discharged by a sheet inversion unit 136 is inverted. An image is formed again on the inverted sheet located on transfer drum 126.

Copy vender 151 includes a coin inlet 153 through which a coin is inserted, a coin return button 154, a coin outlet 155, and a display 156 that displays the amount of inserted coins. Digital copy machine 100 and copy vender 151 are connected by a cable through a connector 152.

In the present embodiment, printing is allowed by inserting a coin. Alternatively, printing can be permitted by the insertion of a monetary bill, a prepaid card, an IC card, a cash card, and the like.

Figure 2:
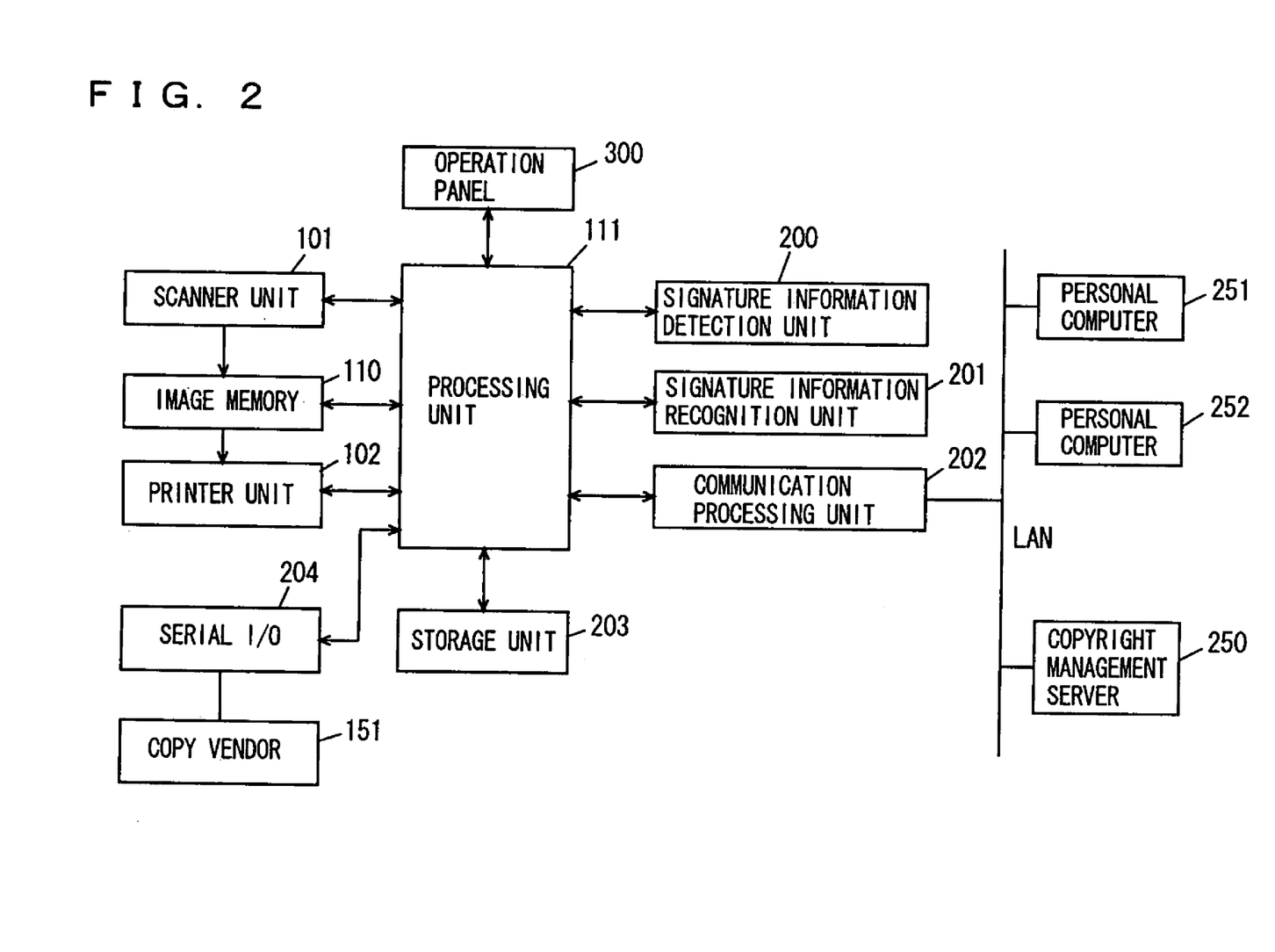
FIG. 2 is a block diagram to describe the structure of a control unit of the digital copy machine of an embodiment of the present invention.

FIG. 2 is a block diagram to describe the structure of the control unit of the digital copy machine of FIG. 1. Referring to FIG. 2, digital copy machine 100 includes processing unit 111 to provide the entire control of digital copy machine 100, an operation panel 300 to set the printing condition of digital copy machine 100 and also the correspondence between trigger information and control information that will be described afterwards, a storage unit 203 storing trigger information and control operation in correspondence set by operation panel 300, the aforementioned scanner unit 101, printer unit 102, image memory 110, a signature information detection unit 200 to detect signature information from the image data stored in image memory 110, a signature information recognition unit 201 to recognize the detected signature information, a communication processing unit 202 connected to external personal computers 251 and 252 and to a copyright management server 250 through Local Area Network (hereinafter referred to as LAN), and a serial I/O 204 for serial connection with copy vender 151.

Figure 3:
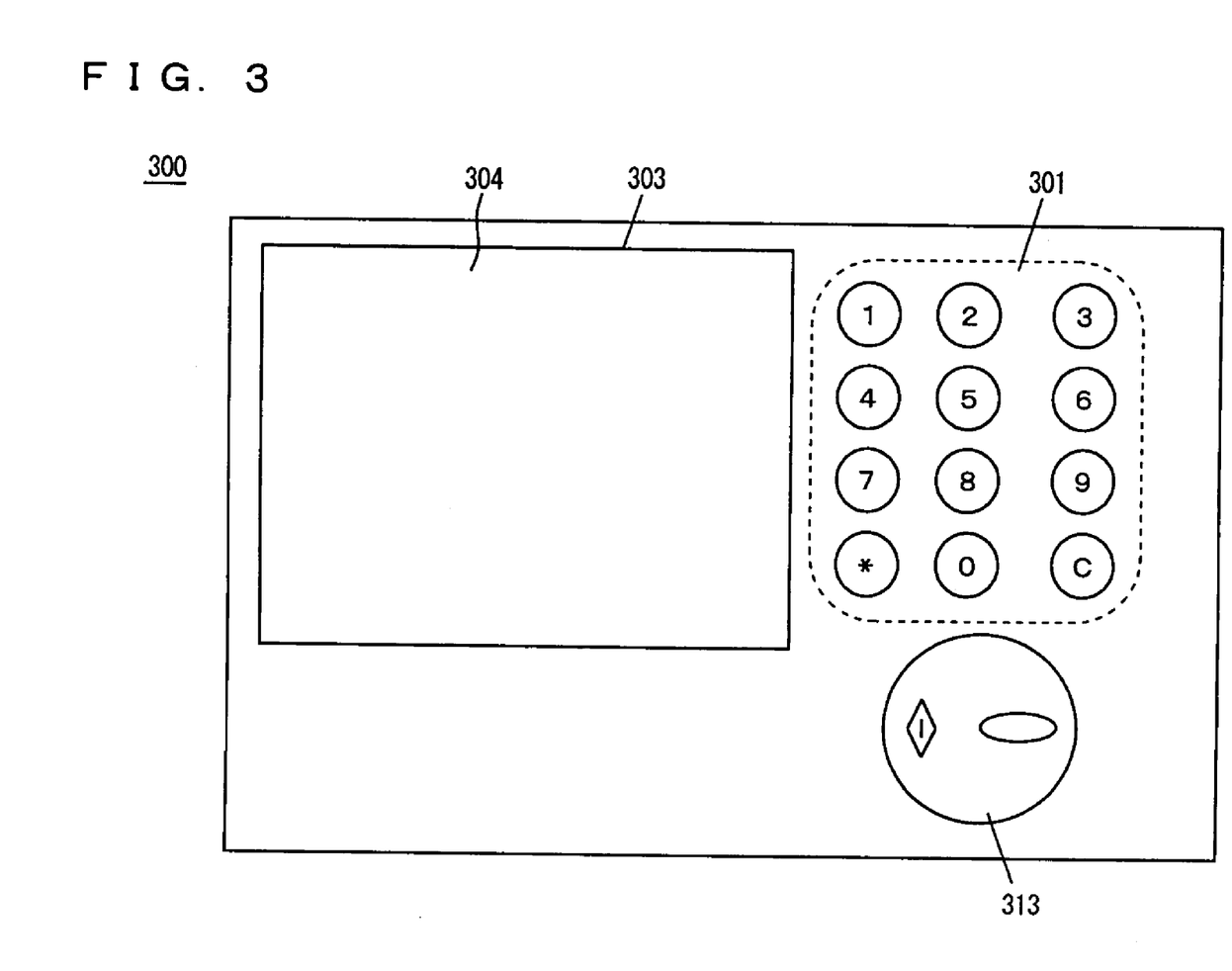
FIG. 3 is a plan view of an operation panel provided at a top face of a digital copy machine according to an embodiment of the present invention.

Operation panel 300 is provided at the top face of digital copy machine 100 to input the setting of print conditions in printing out through printer unit 102 of digital copy machine 100 and the setting of trigger information and control operation. FIG. 3 is a plan view of operation panel 300. Referring to FIG. 3, operation panel 300 includes a liquid crystal display unit 303, a touch panel 304 provided thereon and formed of a transparent member, a ten-key 301 to input numerics such as the number of prints and the print magnification rate and the like, and a start key 313 to designate initiation of printing.

Liquid crystal display 303 displays the print condition currently set in digital copy machine 100 and the internal status. The operator depresses touch panel 304 on liquid crystal display 303 according to a menu displayed at liquid crystal display 303 to input the print condition and set the trigger information and the control operation corresponding to the trigger information. Alphanumerics and kanji characters can be input by displaying Japanese syllabary and alphabets on liquid crystal display 303.

Referring to FIG. 2, the trigger information and control operation input through operation panel 303 are stored in correspondence in storage unit 203. The trigger information and control operation will be described in detail afterwards.

Communication processing unit 202 transfers data between externally connected personal computer, LAN and public switched telephone network (PSTN) and processing unit 111. Communication processing unit 202 mainly includes an input/output control unit providing communication control to transmit/receive control signals and image data directly to/from a personal computer, a network control unit connected to LAN to provide network control to transmit/receive control signals and image data to/from an external LAN-connected apparatus, a facsimile conversion unit to transmit/receive data to/from processing unit 111 and carry out conversion such as the pixel density, coding method and the like in a facsimile operation, and a G3 unit that provides communication control such as modulation and demodulation of image data and control signals in a facsimile operation, and connected to the telephone line to provide communication control with the PSTN.

FIG. 2 shows the configuration of communication processing unit 202 connected with external personal computers 251 and 252 and copyright management server 250 through the LAN. Here, communication control unit 202 uses the network control unit to transmit/receive control signals and image data to/from personal computers 251 and 252 and copyright management server 250 via the LAN.

Processing unit 111 is connected with serial Input and Output interface (I/O) 204 to effect serial communication with copy vender 151 connected to serial I/O 204. Processing unit 111 carries out serial communication with copy vender 151, whereby a copy fee in accordance with the printing process carried out by printer unit 102 is collected by copy vender 151.

Image data to be printed out by printer unit 102 is stored in image memory 110. Image memory 110 stores image data read in by scanner unit 101 and image data received at communication processing unit 202 from external personal computers 251 and 252.

Signature information detection unit 200 detects signature information from the image data stored in image memory 110. Here, signature information refers to additional information such as ID, logo marks, the label of the copyrighted document, code information, and the like embedded in the image data. The well known art is employed as to the technique of embedding signature information in the readout image data of a document or the technique of detecting signature information from image data in which signature information is embedded. For example, the technique of embedding signature information in image data includes the method of adding signature information into the luminous value of an image, and the method of converting image data into frequency components to embed signature information into a particular frequency component. FFT (Fast Fourier Transform), DCD (Discrete Cosine Transform) and the like are used for frequency conversion. Signature information may include trigger information to initiate execution of a particular control operation, print condition, image processing condition, and electronic mail address, as will be described afterwards.

Signature information recognition unit 201 recognizes signature information as character information corresponding to the image information detected by signature information detection unit 200. In this case, the well known character recognition method is employed.

Copyright management server 250 is a computer to audit the copy fee for each document or image data. The copy fee is calculated for each document according to the received number of prints from communication processing unit 202, whereby the payment charging process is carried out.

Figure 4:
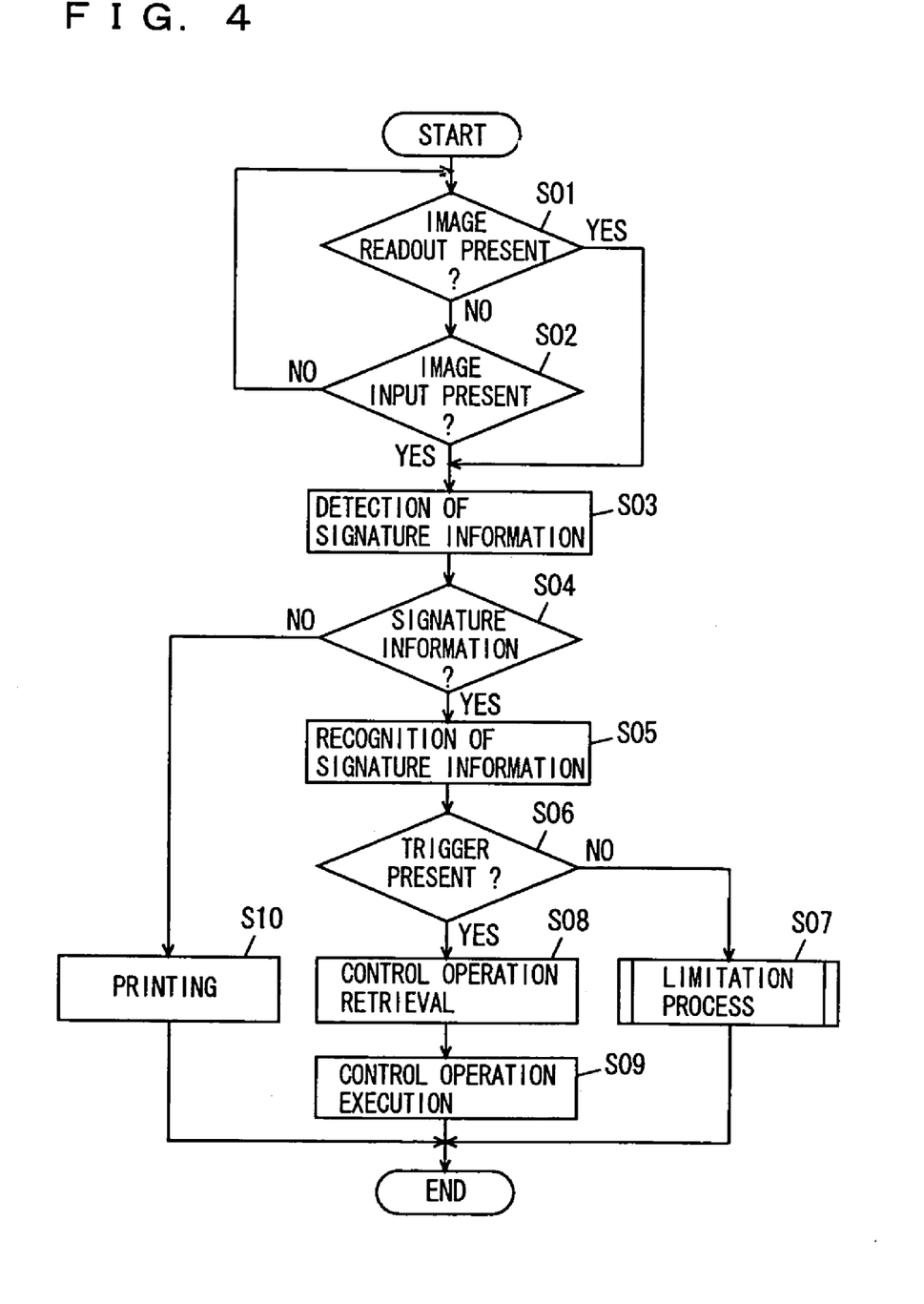
FIG. 4 is a flow chart showing the process carried out by a digital copy machine according to an embodiment of the present invention.

FIG. 4 is a flow chart showing the process carried out by digital copy machine 100. Referring to FIG. 4, digital copy machine 100 determines whether image data has been read out or not (step S01). This determination of image data read out is effected by sensing depression of start button 313 on operation panel 300. This determination can be made at the time point when image data that is the digital version by processing unit 111 of analog signals read out from scanner unit 101 is stored in image memory 110.

In the case where image data readout is detected, control proceeds to step S03. In the case where image data readout is not detected, determination is made whether image data has been input or not (step S02). Input of image data refers to reception of image data from external-connected personal computers 251 and 252 at communication processing unit 202 through the LAN. Input of image data is sensed at the time point when the received image data is stored in image memory 110. In the case where image data input is detected, control proceeds to S03, otherwise to step S01 since image data will not be stored in image memory 110 by image data readout or image data input.

At step S03, signature information detection unit 200 detects the signature information from the image data stored in image memory 110. The detected signature information is currently image data.

At step S03, determination is made whether signature information has been detected or not (step S02). When signature information has not been detected, the image data read in by scanner unit 101 or the image data received by communication processing unit 202 is printed out by printer unit 102 (step S10). In the case where signature information has been detected (YES at step S04), character recognition is effected for the signature information detected at signature information recognition unit 201. Character recognition here is the process of converting the signature information which is the image data detected by signature information detection unit 200 into character data to recognize the signature information as characters. The well known character recognition technique is employed for this process.

Determination is made whether the signature information recognized as characters is trigger information or not (step S06). Trigger information is code information set through operation panel 300, for example, numerics or alphabets of a predetermined number of characters. Trigger information is a mark to initiate execution of a predetermined control operation. Therefore, the trigger information does not necessary correspond to character data, and may be image data. In the case where trigger information is image data, conversion into character data is not carried out in recognizing the signature information by signature information recognition unit 201. The presence/absence of trigger information is determined at step S06 directly by the image data.

In the case where the signature information is not trigger information (NO at step S06), control proceeds to step S07 to carry out the process to limit printing with respect to copyrighted material. This limitation process will be described afterwards.

In the case where the signature information is trigger information (YES at step S06), the control operation corresponding to the trigger information detected in step S06 is retrieved from strage unit 203 (step S08).

Figure 6:
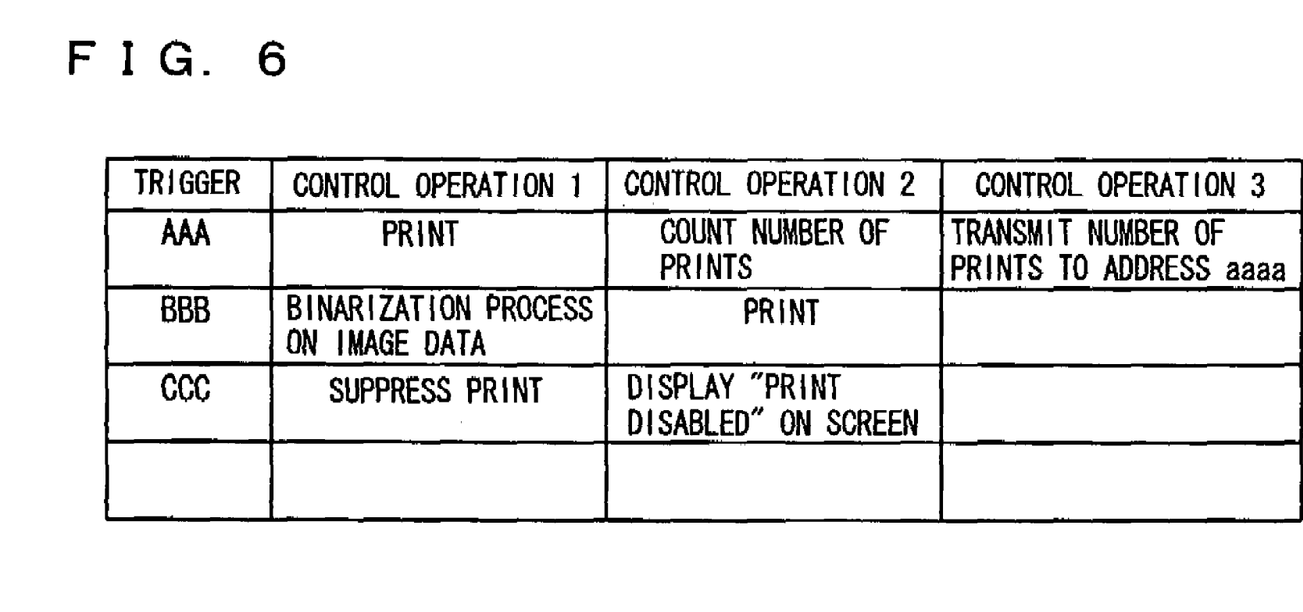
FIG. 6 shows the trigger information and control operations stored in the storage unit of the digital copy machine of an embodiment of the present invention.

Here, trigger information and control operation will be described. Trigger information and corresponding control operation are input through operation panel 300. First, operation panel 300 is set to the mode to input trigger information. Using alphanumerics key and the like displayed on liquid crystal display 303, a code which is the trigger information is input. Here, alphabets of three characters are taken as a way of example. Next, a control operation corresponding to that trigger information is selected. More specifically, a plurality of selections are displayed on liquid crystal display 303. An appropriate selection is made by depressing touch panel 304. Following the selection of all the control operations required, the "*" key of ten-key 301 is depressed, whereby the trigger information and corresponding control operation are registered in storage unit 203. FIG. 6 shows trigger information and corresponding control operations stored in storage unit 203. For the trigger information of "AAA", correspondence is established of control operation 1 of "print", control operation 2 of "count number of prints", and control operation 3 of "transmit number of prints to address aaaa". More specifically, when the trigger information of "AAA" is recognized by signature information recognition unit 201, the operation of printing by printer unit 102 the image data stored in image memory 110 is carried out as the first control operation, the operation of counting the number of prints of the image data by printer unit 102 is carried out as the second control operation, and the operation of transmitting to copyright management server 250 having the electronic mail address of "aaaa" the number of counted prints in the second control operation is carried out as the third operation.

Similarly, for the trigger operation of "BBB", correspondence is established of the operation of "binarization process on image data" as control operation 1, and the operation of "print" as control operation 2. When trigger information "BBB" is recognized by signature information recognition unit 201, the image process of binarizing the multi-value image data stored in image memory 110 is carried out by processing unit 111 as the first control operation, and the operation of printing out the image data subjected to binarization in the second control operation is carried out by printer unit 102 as the second control operation.

For the trigger information of "CCC", correspondence of the operation of "suppress print" as control operation 1 and the operation of "display print disabled on screen" as control operation 2 is established and stored. When the trigger information of "CCC" is recognized by signature information recognition unit 201, a signal inhibiting image data printing is output to printer unit 102 and the image data stored in image memory 110 is erased as the first operation. Then, a message of "this document cannot be printed", for example, is displayed on liquid crystal display 303 of operation panel 300 as the second operation.

Thus, upon recognition of trigger information by signature information recognition unit 201, the series of control operations in correspondence with the recognized trigger information is retrieved from storage unit 203.

Returning to FIG. 4, upon retrieval of the control operation corresponding to the recognized trigger information from storage unit 203 at step S08, the retrieved control operation is executed (step S09).

Figure 5:
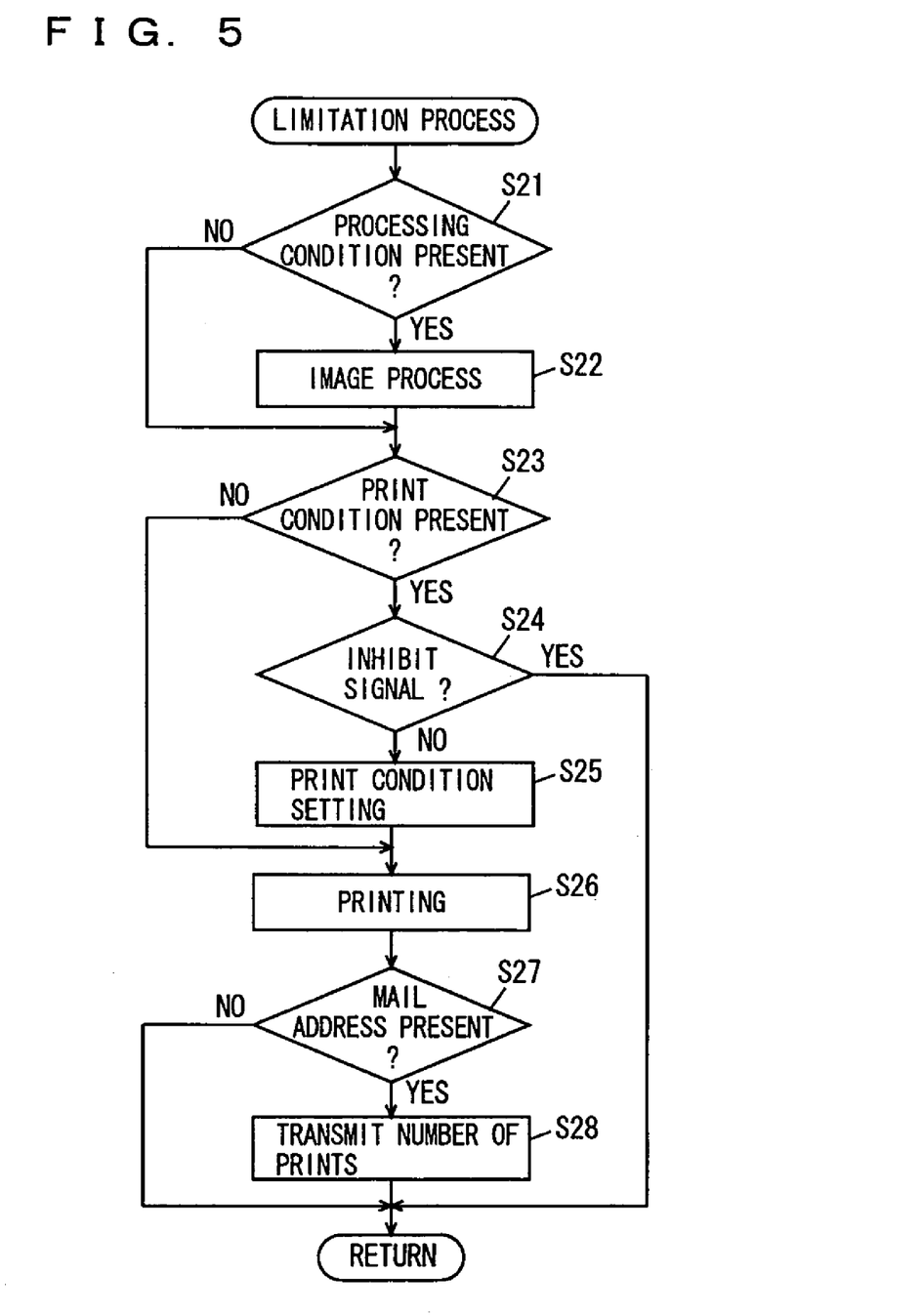
FIG. 5 is a flow chart showing the limitation process carried out at step S07 of FIG. 4.

The limitation process carried out at step S07 of FIG. 4 will be described with reference to the flow chart of FIG. 5. Referring to FIG. 5, determination is made whether the signature information recognized by signature information recognition unit 201 includes a processing condition or not (step S21). A processing condition refers to the designation of carrying out a particular image process on the image data stored in image memory 110. The particular image process includes, for example, image data binarization process, image data magnification/shrink process, modifying the resolution of the image data, the process of reducing the color of image data, for example, converting color image data into black and white image data, and the like. This process is effective in the case where the creator of the document wishes to degrade the quality of the copied product than that of the original document.

In the case where the recognized signature information includes a process condition, an image process according to the process condition is carried out by processing unit 111 on the image data stored in image memory 110 (step S22).

Then, determination is made whether a printing condition is included in the recognized signature information (step S23). Here, a printing condition refers to the condition for a printing operation by printer unit 102. For example, the condition includes the number of prints, the printing density, the magnification/shrinkage rate, and the like. This printing condition is effective when the creator wishes to specify the number of copies that can be printed out for the purpose of limiting the number of the copies, or when the creator wishes to lower the density of the printout to degrade the quality from the original document, or when a shrinkage rate is specified so that the size of the printed out copy becomes smaller than that of the original document.

The print condition also includes a print inhibit signal. This is effective in the case where the creator of the document wishes to prevent his/her work from being copied. At step S24, determination is made whether the print condition corresponds to "inhibit signal" or not. In the case of an inhibit signal, the subsequent process is not executed and control returns to the main routine of FIG. 4.

In the case where the print condition does not correspond to an inhibit signal (NO at step S24), printer unit 102 is set to the print condition included in the signature information (step S25). Then, printing is carried out under the set printing condition (step S26).

When the printing ends, determination is made whether a mail address is included in the recognized signature information (step S27). When a mail address is included in the recognized signature information (YES at step S27), the number of prints output at step S26, the code information indicating the printed copyrighted material (document), and information indicating the printing event are transmitted from communication processing unit 202 to the mail address (step S28). In the present embodiment, the number of prints is transmitted as one of the printing condition. However, other printing conditions, for example, whether of a color mode or black and white mode, the print scaling rate, sheet size, and the like can be transmitted.

The mail address included in the signature information is the mail address of the owner of the document or copyright management server 250. The creator of the document or the facility auditing the copyright can identify the number of printouts of the document. Accordingly, the creator of the document or the facility auditing the copyright can charge royalties and the like to the person or entity that has carried out the copy. Also, the amount of the copies printed out can be identified.

At this stage, communication can be established between communication processing unit 202 and copyright management server 250 to transmit the copy charge to communication processing unit 202 from copyright management server 250, so that the copy fee can be collected through copy vender 151.

The digital copy machine of the present embodiment detects and recognizes signature information from the image data read out by scanner unit 101 or the image data received at communication processing unit 202. In the case where the signature information includes a processing condition designating a particular image process, the designated image process is applied on the image data, so that the image process intended by the creator of the document of interest is applied to output the image data on a recording medium such as a sheet of paper. Accordingly, the quality of the image data printed out on the recording medium can be degraded than that of the original document.

In the case where the signature information includes a print condition, printer unit 102 is set to the print condition included in the signature information. Therefore, the image data can be printed out according to the printing condition desired by the creator. In the case where the printing condition corresponds to an inhibit signal, printing is suppressed at printer unit 102. Therefore, copy of the original can be inhibited to prevent output of the image data onto a sheet of paper and the like.

In the case where the signature information includes a mail address, the number of prints carried out by printer unit 102 is transmitted to the mail address from communication processing unit 202. By setting the mail address to the mail address of the creator or copyright management server 250, the number of prints of the document or image data can be identified on the part of the creator or copyright management server 250. Thus, the creator or the copyright administrator can charge the person or entity that has carried out printing of the original or image data.

In the case where the signature information includes trigger information to initiate execution of a predetermined control operation, the control operation corresponding to the trigger information included in the signature information stored in storage unit 203 is executed. The above-described advantages can be obtained by providing setting of the image process according to the above processing condition in the control operation, printing according to a printing condition, data transmission to a mail address, and the like.

Since the trigger information and control operation can be input and set through operation panel 303, the condition of printing out the image data stored in image memory 110 onto a recording medium such as paper can be modified arbitrarily.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:
   an input unit entering image data,
   a printer unit printing image data,
   a memory storing trigger information to initiate execution of a plurality of control operations in association with said control operations,
   a detector detecting additional information including said trigger information from said image data, and
   a controller responsive to detection of said trigger information to sequentially execute said control operations corresponding to said trigger information stored in said memory,
   wherein said control operations include a transmitting print information related to printing of said image data to a destination.

2. The image formation apparatus according to claim 1, further comprising an operation unit setting said trigger information in association with said control operations.

3. The image formation apparatus according to claim 1, wherein said print information includes information indicating an event of printing said image data.

4. The image formation apparatus according to claim 1, wherein said print information includes a print condition in printing said image data.

5. The image formation apparatus according to claim 1, wherein said control operations include a print operation printing out said image data according to a predetermined print condition.

6. The image formation apparatus according to claim 1, wherein said control operations include an image processing operation processing said image data according to a predetermined image processing condition.

7. The image formation apparatus according to claim 1, wherein said control operations include an operation of transmitting said print information to a destination specified by an electronic mail address through electronic mail.

8. An image recording apparatus comprising:
   an input unit entering image data,
   a record unit recording input image data on a recording medium,
   a detector detecting additional information from said image data, said additional information including trigger information to initiate execution of a plurality of predetermined control operations, and
   a controller sequentially executing said predetermined control operations in response to detection of said trigger information,
   wherein said predetermined control operations include a transmission operation transmitting information related to recording of said image data to a destination.

* * * * *

UNITED STATES PATENT AND TRADEMARK OFFICE
CERTIFICATE OF CORRECTION

PATENT NO. : 7,113,291 B1
APPLICATION NO. : 09/494253
DATED : September 26, 2006
INVENTOR(S) : Osamu Yamada et al.

Page 1 of 1

It is certified that error appears in the above-identified patent and that said Letters Patent is hereby corrected as shown below:

On the title page,

ITEM "(56) Reference Cited, FOREIGN PATENT DOCUMENTS", change
" JP 10-282141  8/1988" to -- JP 10-262141 8/1998 --

Signed and Sealed this

Twenty-ninth Day of May, 2007

JON W. DUDAS
*Director of the United States Patent and Trademark Office*